UNITED STATES PATENT OFFICE.

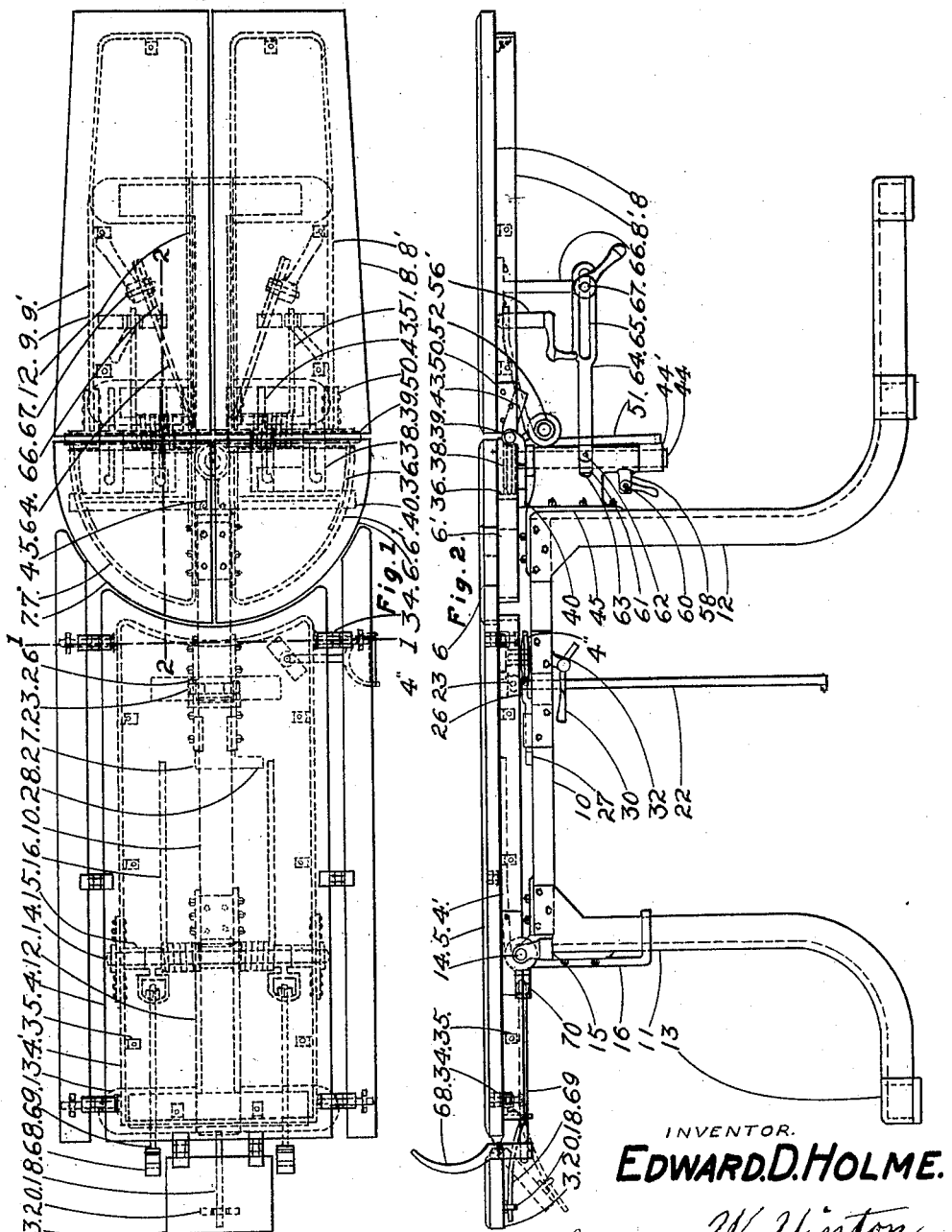

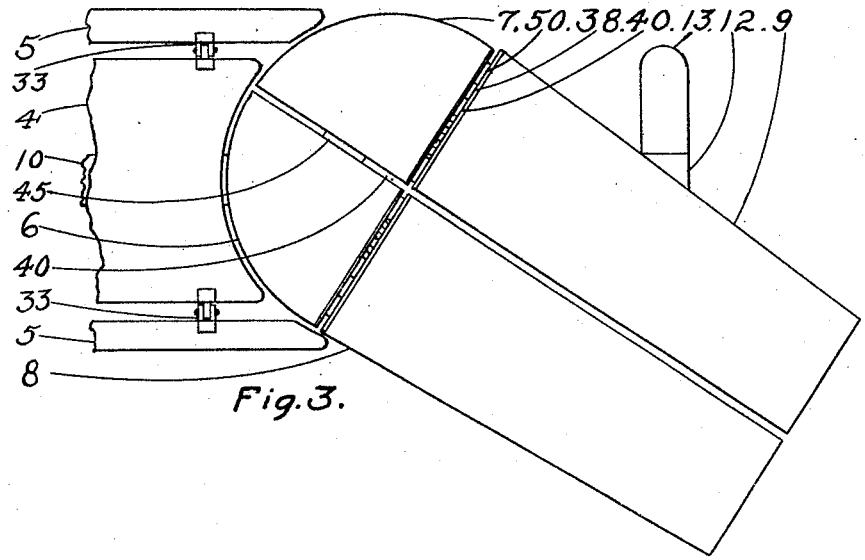
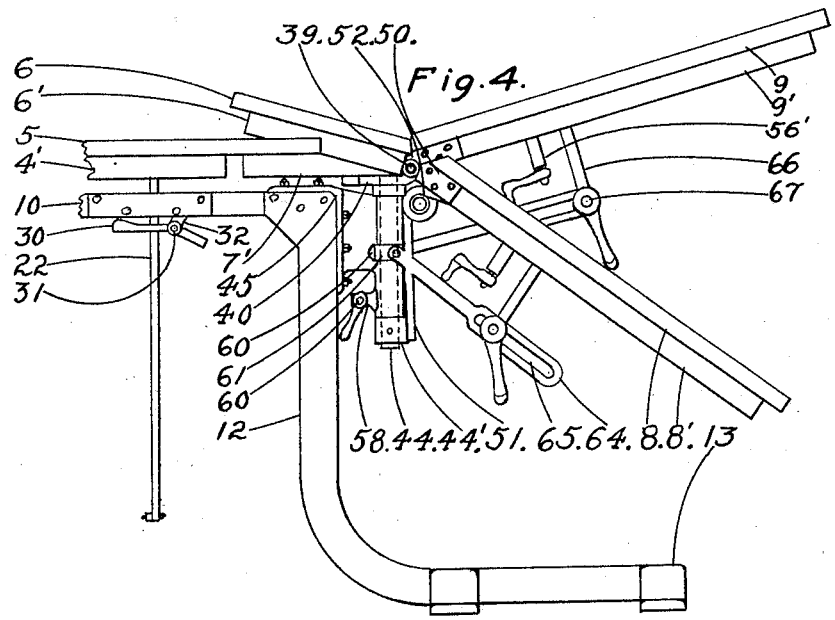

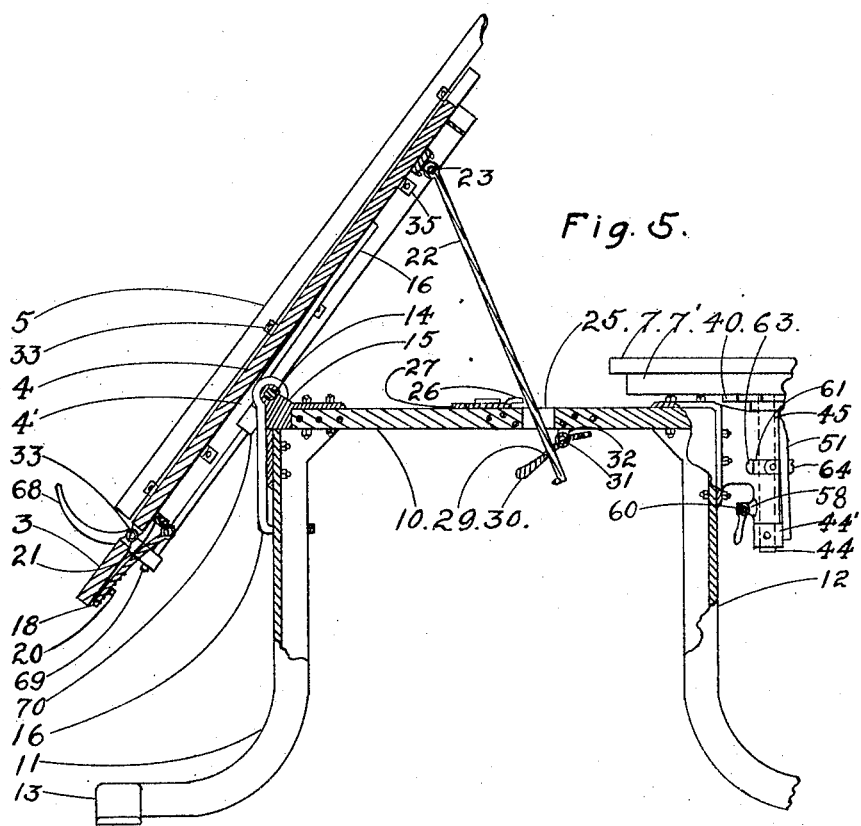

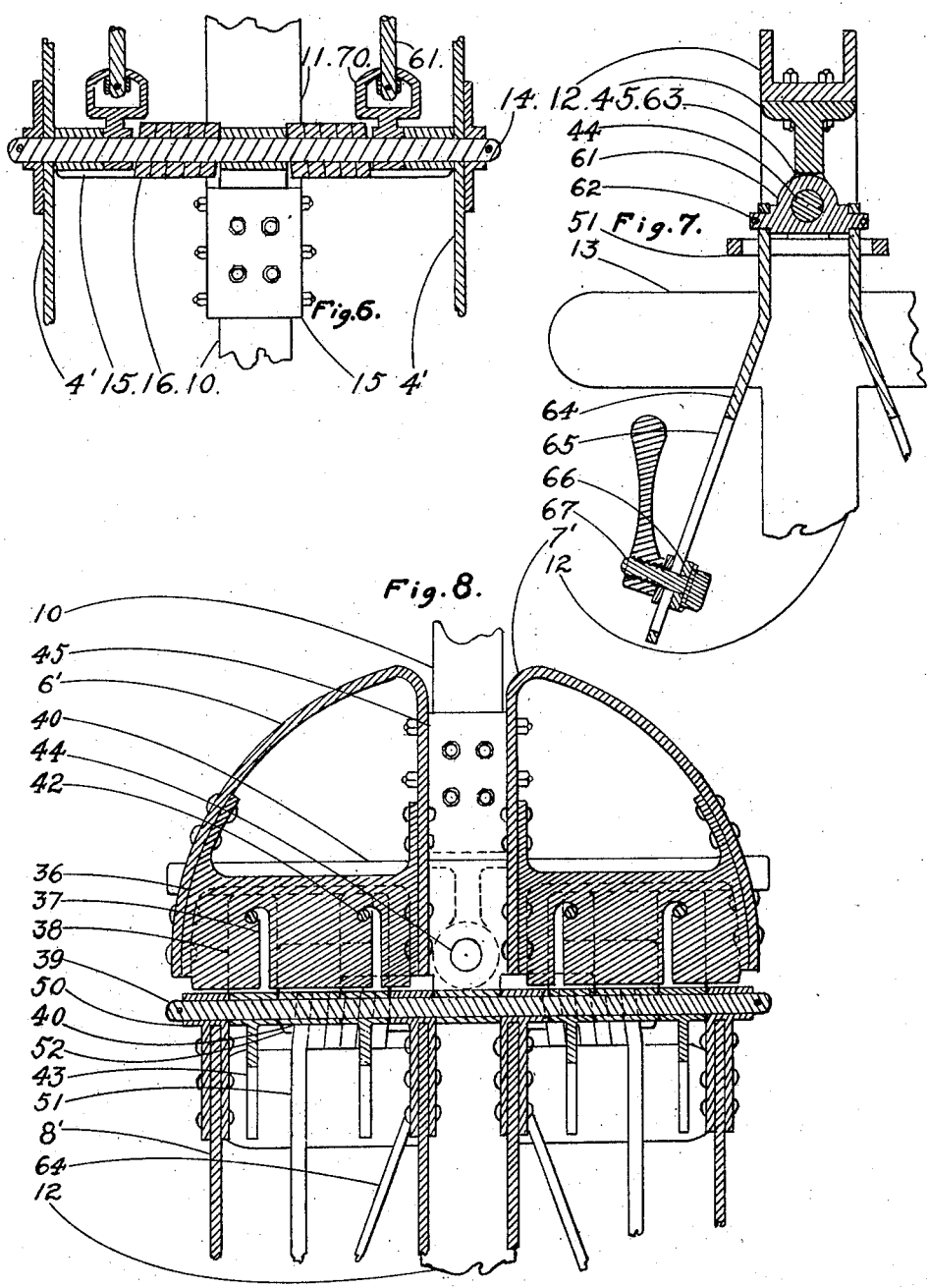

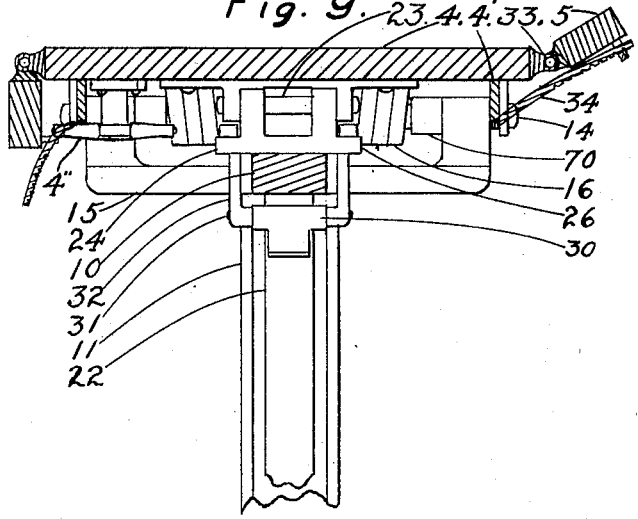
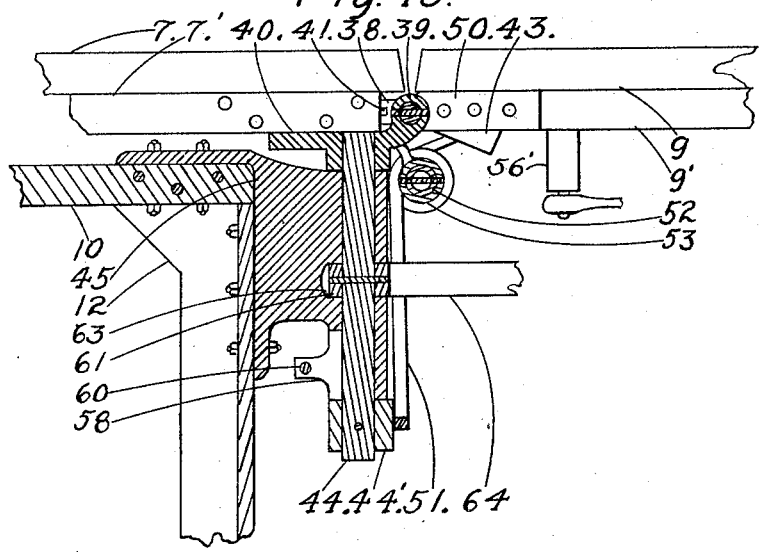

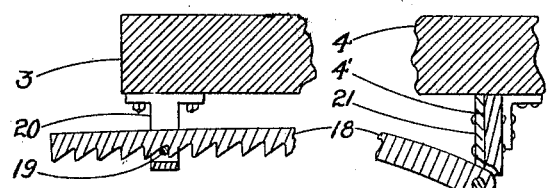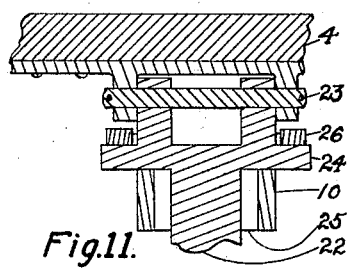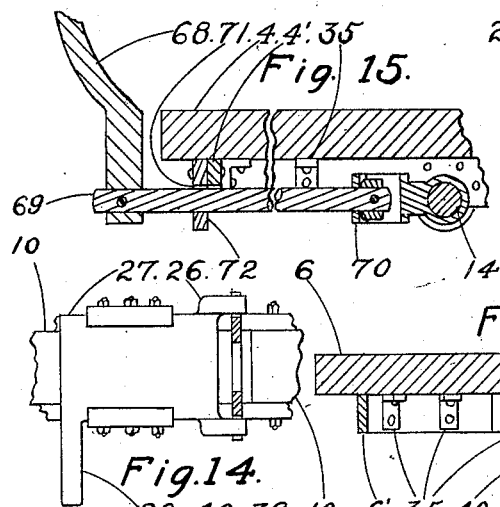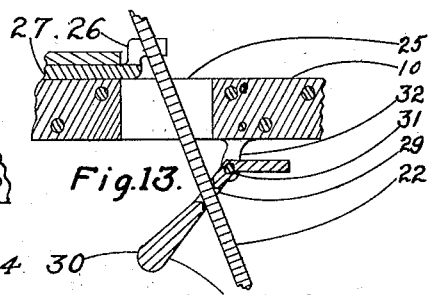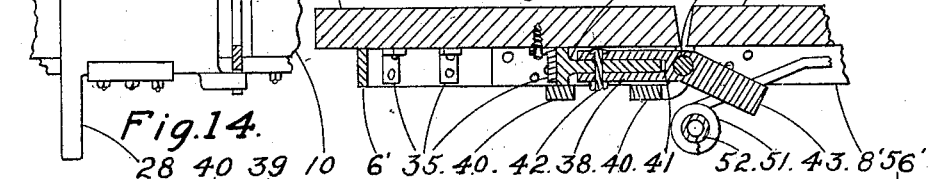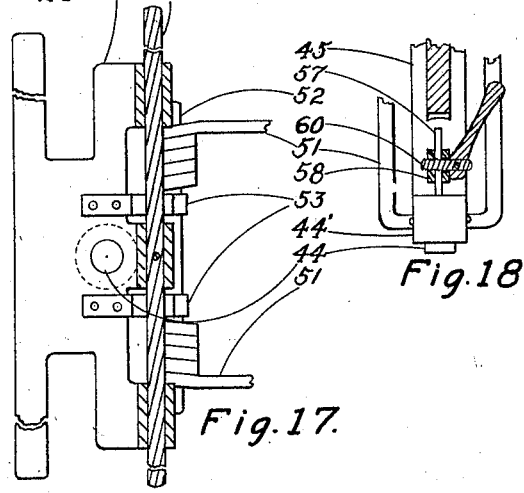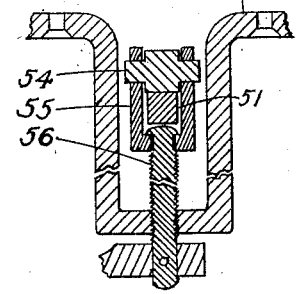

EDWARD D. HOLME, OF ST. JOSEPH, MISSOURI.

OSTEOPATHIC-TREATMENT TABLE.

1,400,546. Specification of Letters Patent. Patented Dec. 20, 1921.

Application filed November 15, 1920. Serial No. 424,122.

*To all whom it may concern:*

Be it known that I, EDWARD D. HOLME, a citizen of the United States, residing at St. Joseph, in the county of Buchanan and State of Missouri, have invented certain new and useful Improvements in Osteopathic-Treatment Tables, of which the following is a specification, reference being had therein to the accompanying drawing.

My invention relates to improvements in that class of tables on which patients are placed in various positions for osteopathic treatment, and the objects of my improvements are, first, to provide a simple, substantial and durable table of this class, which shall be cheap in cost of manufacture and in which ready means are provided for placing the patient in a more extended variety of positions, than can be done on the tables now generally in use, second; to so construct and arrange the parts of the table, that the patient can be moved from one position into any other one of said variety of positions, without removing him from the table, third: to so construct the parts of the table that the osteopathic practitioner using the same, shall be provided with every convenience for easily and quickly finding unobstructed access to all of the various parts of the person of said patient, fourth: to provide holding means, whereby the trunk portion of the patient shall be held against falling from the table, fifth; to provide automatically operated hip elevating means whereby the two portions of the table, on which the hips of the patient are supported, are independently raised by the lowering of their respective leg supporting portions of the table.

I attain these objects by the devices illustrated in the accompanying drawings, in which:

Figure 1 is a top plan of the table, showing the parts in normal position. Fig. 2 is side view of the parts shown and indicated in Fig. 1. Fig. 3 is a top plan of a portion of the table, showing the leg and hip supporting portions of the same turned to one side, at an angle to the body supporting portion. Fig. 4 is a side view of a portion of the table, showing the leg supporting portions in raised and lowered positions respectively, and a hip supporting portion automatically raised by its respective lowered leg supporting portion. Fig. 5 is a side view of a portion of the table, showing the body support in an inclined position.

Fig. 6 is an enlarged horizontal section in detail, of the body-support hinging means, cut longitudinally through the center of the hinge bolt, looking downward. Fig. 7 is an enlarged horizontal section in detail of the leg support securing means, cut through the center of the clamp bolt, looking downward. Fig. 8 is a section similar to Fig. 7, of the leg and hip support hinging means, cut longitudinally through the center of the hinge bolt. Fig. 9 is an enlarged vertical section in detail, on the line 1 1, seen in Fig. 1, of the body support and the leaves hinged thereon, looking toward the left. Fig. 10 is a section similar to Fig. 9, cut through the center of the vertical pivot shaft, looking toward the rear edge of the table. Fig. 11 is an enlarged transverse section in detail, of the body-support adjusting means, cut vertically through the center of the adjusting rod looking toward the head of the table. Fig. 12 is an enlarged longitudinal section in detail, cut vertically through the center of the head rest and its adjustable supporting means. Fig. 13 is an enlarged section in detail, cut vertically through the center of the body-portion securing rod and its adjustable securing means, looking toward the rear edge of the table, certain parts being broken away. Fig. 14 is a top plan of the slidably mounted rod holding means, a portion of which is seen in Fig. 13. Fig. 15 is a longitudinal section in detail, cut vertically through the center of one of the shoulder supports, the upper portion of the support and certain other portions being broken away.

Fig. 16 is a vertical section in detail, of one of the hip supports and of its fastening means, on the line 2—2, seen in Fig. 1, looking toward the rear edge of the table.

Fig. 17 is a top plan in detail, of the head of the vertically mounted pivot shaft, certain parts being broken away.

Fig. 18 is a vertical section in detail, of the vertical shaft holding means, seen in Fig. 2, looking toward the right.

Fig. 19 is an enlarged vertical section in detail, of the spring adjusting means, cut transversely through the free end portion of the spring seen in Fig. 16, certain parts being broken away.

Referring to Fig. 1, the top of the table comprises the head rest 3, the body support 4, the leaves 5, the hip supports 6 and 7, and the leg supports 8 and 9.

Said table top is supported on the following described frame. The stringer 10, on the respective ends of which, the upper end of the legs 11 and 12 are secured. The lower ends of said legs are formed with their respective feet 13.

The body support 4 is oscillatably mounted on the bolt 14, the central portion of which is in the bearing 15, which latter is secured on the head end of the stringer 10, as seen in Figs. 5 and 2.

The helical springs 16 are mounted on said bolt, their extended upper ends pressing against the right end portion of the lower surface of said body support, for assisting the practitioner in raising said end portion. The extended lower ends of said springs are hooked onto and press against the outer surface of the leg 11.

Said body support is provided with the head rest 3, which is hinge connected with the metal flange 4', which is secured on the marginal portions of the lower surface of the body support 4, for strengthening the latter. Said head rest is secured against downward movement from variously inclined positions, by the ratchet toothed rod 18, the teeth of which engage the holding pin 19, which is secured in the lower portion of the pin support 20, which is secured on the outer edge of the lower surface of said head rest. The inner end of said rod is connected with the flange 4', by the hinge 21, as seen in Fig. 12.

Referring to Figs. 11 and 2, the upper end of the body-support adjusting rod 22 is pivotally connected with said body support, by the pin 23, which is secured on the lower surface of the body support 4. The rod extensions 24 are formed with the pivoted end of said rod 22, and extend therefrom toward each edge of the table. Said rod is passed through the mortise 25, which is formed through the stringer 10. Said rod extensions rest upon said stringer, for supporting the rod connected end of said body support while it is in its level or normal position. The rod holders 26 are formed on one end of the plate 27, which is slidably mounted on the stringer 10. The other end of said plate is provided with the handle 28, formed therewith; whereby said plate and the therewith formed rod holders are slid, for simultaneously sliding said rod holders from over the rod extensions 24, for releasing the adjusting rod 22. Said adjusting rod is passed through the mortise 29, which is formed through the weighted rod grip 30, at an incline to the latter.

The inner edges of said mortise are so formed, that they bite into or grip the rod 22, by reason of the gravitation of the weighted free end portion of said rod grip.

The other end of said rod grip is provided with the grip pivots 31 which are secured in each side of said rod grip and extend therefrom through the two bearings 32, of which but one is shown. Said bearings are secured on the vertical sides of the stringer 10.

Referring to Fig. 9, the body support 4 is provided with a leaf 5, hinge secured on each one of its longitudinal edges, by the hinges 33. Said leaves are adjustably secured at various angles of inclination to the body support 4, by their respective ratchet toothed rods 34. Since said rods are like the rod 18, seen in Fig. 12, in construction and operation, they are neither shown nor described in detail.

Since the hip supports 6 and 7 are alike in construction and operation, the support 6 only, is described in detail.

The reinforcing flange 6' is secured on the marginal portion of the lower surface of the hip support 6, by the angle plates 35 secured to them.

The slotted plate 36 is secured to said flange 6'. The slots 37 are of bayonet fastening formation and are formed through said plate, as seen in Fig. 8.

One end of the fastening member 38 is oscillatably mounted on the bolt 39, the central portion of which bolt is secured in the pivot head 40. The free end of said member is provided with the slot 41, formed horizontally therethrough. The slotted edge of the plate 36 is detachably secured in the slot 41, by the bolt 42, which is passed through said member and its slot 41. The member moving arm 43 is formed on the mounted end of the member 38, and is automatically lowered by movement thereagainst of the leg support 8, when said support is lowered, as hereinafter described.

The pivot head 40 (see Fig. 17,) is secured on the upper end of the pivot shaft 44, which is mounted in the shaft support 45, for oscillation in a horizontal plane. Said shaft support is secured on the upper portion of the leg 12, as seen in Fig. 2. The lower end of said shaft is detachably held against oscillation, by the following described clamp.

The slot 57 is formed through one side of the lower end portion of the shaft support 45. The flanges 58 are formed with said support at either side of said slot. The clamp bolt 60 is passed through one of said flanges and is screwed through a screw threaded aperture, formed through the other flange, for clamping the lower portion of said support on said pivot shaft.

It will be seen in Figs. 1 and 3, that the inner end of the body support 4 and the adjacent ends of the hip supports 6 and 7 are formed as arcs of circles, the common center of which is the center of the shaft 44.

The inner ends of the leg supports 8 and 9 are oscillatably connected with the bolt 39, by the hinge members 50, the free ends of which are securely connected with said leg supports. Since said leg supports are alike in construction and operation, but one is described in detail.

The helical springs 51 are mounted on the tube 52, the center of which tube is secured in the tube mounting means 53, which mounting means are connected with the pivot head 40, as seen in Fig. 17. The lower ends of said springs are united and press against the collar 44', which is secured on the lower end of the shaft 44. The upper, extended ends of said springs press against the lower surface of their respective adjusting wheels 54. Since said adjusting wheels are alike in construction and operation, but one is described in detail.

The wheel 54 is rotatably mounted in the upper end of the wheel carrier 55. Said carrier is raised and lowered by the screw 56, screwed through the bottom portion of the adjuster support 56', the upper end of which is secured on the under surface of the leg support 8.

The collar 61 (see Fig. 7,) is provided with a stud 62 formed on each diametrically opposite side thereof. Said collar is secured on the central portion of the shaft 44, in the cut-out 63, which latter is formed in the right portion of the shaft support 45.

The left or inner end of the adjusting rod 64 is oscillatably mounted on the front one of said studs. The free end of said rod extends therefrom to a point beneath the central portion of the leg support 8, as seen in Fig. 2. The slot 65 is formed through the extended end portion of said rod, which portion is clamp secured on the lower end of the bracket 66, by the clamp screw 67. The upper end of said bracket is rigidly secured on the lower surface of the leg support 8, forming adjusting means whereby said leg support is adjusted and secured at various angles of inclination.

When the body support 4 is tilted from its normal position to the position seen in Fig. 5, the shoulder supports 68 prevent the patient from gravitating therefrom, over the head rest 3.

Since both of said shoulder supports are alike in construction and operation, but one is shown and described in detail.

The lower end of the support 68 (of which but a portion is shown in Fig. 15,) is rigidly secured on the left end of the rod 69, the right end of which rod is mounted in the free end of the stirrup 70, for oscillation in both a vertical and a horizontal plane. The concaved surface of said shoulder support is detachably held against oscillation, by pressure thereagainst of the shoulder of the patient. The other end of said stirrup is mounted on the bolt 14. The shoulder support connected end of said rod 69 is slidably supported in the slot 71, which is formed through the support plate 72.

Said plate is securely connected with the reinforcing flange 4', which latter is secured on the lower surface of the body support 4.

In the operation of my invention, with the patient supports in normal position, as seen in Figs. 1 and 2, the osteopathic practitioner places the unshown patient upon the described table, with his head resting upon the headrest 3. He then moves said head rest to any desired angle of inclination, to the body support 4, at which angle said head rest is securely held against downward movement, by the ratchet toothed rod 18, as shown in Fig. 12. Said practitioner moves the shoulder supports 68 to fit to the width of the patient's shoulders, moves the leaves 5 from the position seen in Figs. 1 and 2, to the position of the designated leaf in Fig. 9, and thereafter moves the body support 4 and the therewith connected parts, from their described positions, to the position seen in Fig. 5, in the following described manner.

The handle 28 (see Fig. 14,) is drawn toward the left, thereby similarly moving the plate 27, which moves the therewith formed rod holders 26 from over the rod extensions 24, seen in Fig. 11. He then lifts the free end portion of the rod grip 30 from the position shown in Fig. 13, thereby releasing the rod 22.

Said practitioner then grasps the handle 4", by which he moves the body support 4 and the therewith connected parts from their described positions, to the position seen in Fig. 5, which movement is assisted by the springs 16.

At this juncture, the free end portion of said rod grip 30 is released after which it gravitates, from its described elevated position, to the position seen in Fig. 5, thereby gripping and holding the rod 22, for holding the body support 4 in its tilted position.

The parts are returned from the position seen in Fig. 5, to their normal position, seen in Fig. 2, in the following manner.

With one hand the practitioner grasps the handle 4" and with the other hand he lifts the free end portion of the bar grip 30, thereby releasing the rod 22, while said grip is held in its elevated position, he retards the movement by gravitation of the body support 4, and the thereon supported body of the patient, by use of the handle 4". This movement overcomes the action of the springs 16, and is stopped by contact of the rod extensions 24 with the stringer 10, as seen in Fig. 11. He then releases the grip 30, after which he returns the rod holders 26, to their normal position, over said rod extensions, for rigidly holding the rod 22 in its normal position. The leaves 5 (see Fig. 9,) are released by lifting the free ends of their ratcheted rods 34, they are then lowered to normal position, and are thereafter automatically secured by releasing said rods.

For rendering the longitudinal edges of the tables more accessible the leaves 5 are lowered from their normal position to the position, of the undesignated leaf seen in Fig. 9.

Referring to Fig. 4, the practitioner with one hand grasps the free end of the leg support 8, and with the other hand he loosens the clamp screw 67, after which he lowers the thus freed end of said leg support (overcoming the spring 51,) from the position seen in Fig. 2, to the position seen in Fig. 4. He then tightens said clamp screw and removes his hands from said parts.

During the latter portion of this movement, said leg support 8 presses upon the arm 43 (see Fig. 16,) and thereby moves the hip support 6 from the position seen in Fig. 2, to the position seen in Fig. 4.

After these movements have been accomplished, the practitioner again grasps said leg support, loosens the clamp screw 67 and moves said leg support to normal position, assisted by the springs 51, after which he again tightens said clamp screw.

In the same manner said practitioner can raise said leg support to an elevated position, similar to the position of the leg support 9. Since said support 9 is the same in construction and operation as the leg support 8, its operation is not described.

By leaving the clamp screws in their loosened position, the practitioner can move either one or both of said leg supports upward and downward, either simultaneously or alternately, and thereby similarly move the hip supports 6 and 7.

With the leg and hip supports secured in normal position, the practitioner loosens the clamp screw 60, (see Figs. 18 and 4,) thereby releasing the vertical shaft 44, after which he grasps the outer edges of the free ends of the leg supports 8 and 9, and thereby moves said supports and the therewith connected hip supports 6 and 7, from the position seen in Fig. 2, to the position seen in Fig. 3. Said practitioner can laterally swing said supports from side to side, back and forth, as desired, and can secure said supports at any point, by tightening the clamp screw 60, after which he loosens said screw, returns said supports to their normal position seen in Fig. 2, and thereafter tightens said clamp screw.

Said practitioner moves the patient from one side of the table to the other, for uncovering the hip supports 6 and 7, and while thus exposed, he detaches the plates 36 from their respective fastening members 38, and thereafter lays aside said hip supports together with their respective plates 36. He then loosens the clamp screw 60, thereby releasing the vertical shaft 44, after which he swings the leg supports 8 and 9 to one side, to the limit of their lateral movement, from beneath the legs of the patient, for permitting easy access to his person, for the treatment of rectal ailments.

Said practitioner returns the detached parts and the leg supports 8 and 9 to their normal position, seen in Fig. 2, after which the patient is placed astride the body support 4, near the head rest 3, which latter he swings downward to a vertical position, for permitting easy access to the body of the patient.

For the same reason, the leaves 5 are lowered to the position of the undesignated leaf, seen in Fig. 9.

After treatment, the patient is removed from the table, and said leaves and head rest are returned to their normal position seen in Fig. 2, in which position they are automatically secured by their respective ratchet toothed rods 34 and 18.

Having fully described my invention, what I claim as new and desire to secure by Letters Patent, is:

1. In an osteopathic treatment table; a body support provided with a head rest therefor, said body support being adapted to normally support the body portion of a patient thereon in a horizontal position said body support having a head end portion and a major body portion formed thereof; a frame for supporting said table; mounting means secured on said frame beneath the juncture of said head end portion and said major body portion whereby said body support is oscillatably mounted in such manner that it can be oscillated to various degrees of inclination with said head end portion and the therewith connected head rest lower and said major body portion higher than said normal position; holding means securely mounted on the central portion of said frame whereby the adjacent end of said body support is detachably held in a horizontal position; and securing means whereby the said adjacent end of said body support is secured at various degrees of elevation.

2. In an osteopathic treatment table; a body support adapted to support the body portion of a person thereon said body support having a head end portion and a major body portion formed thereof; a frame provided with legs therefor; a bolt the central portion of which is secured on one of the upper corners of said frame beneath the juncture of said head end portion and said major body portion of said body support transversely thereto on which bolt said body support is oscillatably mounted; a helical spring mounted on each end portion of said bolt, the upper ends of said springs being extended a predetermined distance therefrom beneath said major body portion for assisting in raising the latter, the lower ends of said springs being extended and secured on one of the legs of said frame; and securing means whereby said body support is secured in its variously adjusted inclined positions.

3. An oscillatably mounted body support for supporting the trunk portion of a person thereon at various angles of inclination with the shoulders of said person on the lower end portion of said body support; a pair of shoulder supports for partially supporting the shoulders of said person for preventing gravitation of the latter from said body support; a pair of rods on the outer ends of which said shoulder supports are respectively secured; rod mounting means in which the inner ends of said rods are respectively mounted for oscillation in both a horizontal and a vertical plane; and a rod support securely connected with said body support for slidably supporting the free end portions of said rods.

4. In an osteopathic treatment table; a body support for supporting the trunk portion of a person thereon; a leaf hinge connected with each one of the longitudinal edges of said body support for oscillation of said leaves above and below the level of the top of said body support; and leaf securing means whereby said leaves are independently and automatically secured at various angles of inclination to said body support.

5. In an osteopathic treatment table; a frame for supporting said table; a shaft; mounting means secured on said frame wherein said shaft is oscillatably mounted in a vertical position; holding means whereby said shaft is detachably held against oscillation; a shaft head secured on the upper end of said shaft; a pair of leg supports for supporting the legs of a person; a pair of hip supports for supporting the hips of said person; a hinge bolt the central portion of which is secured in said shaft head for supporting said hinge bolt in a horizontal position; hinge members secured on the inner ends of said leg supports said hinge members being oscillatably mounted on said hinge bolt; fastening members oscillatably mounted on said hinge bolt; connecting means secured on said hip supports whereby the latter are detachably connected with said fastening members; an arm formed on each one of said fastening members said arms being extended from the latter downwardly at an incline beneath said leg supports; a tubular shaft the central portion of which is secured in said shaft head for holding said tubular shaft in a horizontal position; springs mounted on said shaft for assisting upward oscillation of said leg supports respectively; and leg support securing means whereby said leg supports are independently secured at various angles of inclination.

6. In an osteopathic treatment table; a pair of leg supports for supporting the legs of a person; mounting means whereby the inner ends of said leg supports are oscillatably supported for independent oscillation; springs whereby said leg supports are independently assisted in their upward oscillation; spring adjusting means whereby the tensions of said springs are separately adjusted; and securing means whereby said leg supports are independently secured at various angles of inclination.

In testimony whereof I affix my signature.

EDWARD D. HOLME.